United States Patent
Yang et al.

(10) Patent No.: US 8,432,374 B2
(45) Date of Patent: Apr. 30, 2013

(54) SNR ENHANCEMENT FOR DIFFERENTIAL INPUT DEVICE

(75) Inventors: Chun-Wei Yang, Hsinchu (TW); Chia-Feng Yang, Hsinchu (TW); Yu-Min Hsu, Hsinchu (TW); Yung-Tse Cheng, Hsinchu (TW)

(73) Assignee: AU Optronics Corporation, Hsinchu (TW)

( * ) Notice: Subject to any disclaimer, the term of this patent is extended or adjusted under 35 U.S.C. 154(b) by 735 days.

(21) Appl. No.: 12/713,468

(22) Filed: Feb. 26, 2010

(65) Prior Publication Data
US 2011/0210924 A1 Sep. 1, 2011

(51) Int. Cl.
*G06F 3/045* (2006.01)
(52) U.S. Cl.
USPC ...... 345/174; 345/176; 178/18.06; 178/18.07
(58) Field of Classification Search .......... 345/173–179; 178/18.01–18.09, 20.01–20.04
See application file for complete search history.

(56) References Cited

U.S. PATENT DOCUMENTS

| | | | |
|---|---|---|---|
| 5,825,351 A * | 10/1998 | Tam | 345/173 |
| 2002/0011991 A1 | 1/2002 | Iwasaki et al. | |
| 2008/0106525 A1 * | 5/2008 | Orr et al. | 345/174 |
| 2009/0045822 A1 | 2/2009 | Nosovitsky et al. | |
| 2009/0243632 A1 | 10/2009 | Ozawa | |

* cited by examiner

*Primary Examiner* — Vijay Shankar
(74) *Attorney, Agent, or Firm* — Morris Manning & Martin LLP; Tim Tingkang Xia, Esq.

(57) ABSTRACT

The present invention relates to a position detector and a touch sensing device of using same with SNR enhancement. In one embodiment, the position detector has (P+1) inputs, each input for receiving an input signal associated with a position, P being a positive integer, and P operational amplifiers, each operational amplifier having a non-inverting input and an inverting input, where the inverting input of the j-th operational amplifier is electrically connected to the non-inverting input of the (j+1)-th operational amplifier, and the non-inverting input and the inverting input of the j-th operational amplifier are electrically connected to the j-th input port and the (j+1)-th input port, respectively, j=1, 2, 3, ..., (P−1).

15 Claims, 4 Drawing Sheets

N, N gain amplifiers, the n-th gain amplifier having an

SNR ENHANCEMENT FOR DIFFERENTIAL INPUT DEVICE

FIELD OF THE INVENTION

The present invention relates generally to position detection, and more particularly, to a position detector with SNR enhancement and a differential input (or touch sensing) device of using same.

BACKGROUND OF THE INVENTION

Touch sensing or touch position detection technology capable of providing a natural interface between an electronic system and user has found widespread applications in a variety of fields, for example, in mobile phones, personal digital assistants (PDAs), automatic teller machines (ATMs), game machines, medical devices, liquid crystal display (LCD) devices, light emitting diode (LED) devices, plasma display panel (PDP) devices, computing devices, and the like, where a user may input desired information and/or operate the electronic system through a touch sensing device associated with the electronic system. A touch sensing device typically includes a detecting unit, a sensing circuit having a plurality of touch sensors and a network of control lines electrically connecting the plurality of touch sensors to the detecting unit, and a touch panel associated with the plurality of touch sensors.

FIG. 4 shows a conventional touch sensing device 10 having a sensor array 1 and detecting unit 2 including a plurality of differential amplifiers 3-8. The sensor array 1 includes a plurality of x-axis sensing electrodes, x1, x2, . . . , x6, and a plurality of y-axis sensing electrodes, y1, y2, . . . , y6, arranged in a matrix form. Each two sensing electrodes are coupled to a single differential amplifier, which is adapted for amplifying the potential difference, developed by touching, between the two corresponding sensing electrodes. Based on the amplitude of the sensed signal, the touch position is determined. However, for such a configuration of the touch sensing device, the sensed signal of a touch is amplified by a single differential amplifier. Accordingly, the sensitivity of the touch sensing device is limited.

Therefore, a heretofore unaddressed need exists in the art to address the aforementioned deficiencies and inadequacies.

SUMMARY OF THE INVENTION

In one aspect, the present invention relates to a touch sensing (or differential input) device. In one embodiment, the touch sensing device includes a sensor matrix. The sensor matrix comprises (M+1) x-axis sensors spatially arranged in an x-axis direction, and (N+1) y-axis sensors spatially arranged crossing over the (M+1) x-axis sensors in a y-axis direction substantially perpendicular to the x-axis direction. M and N are positive integers.

The touch sensing device also includes an x-axis detector. The x-axis detector has M operational amplifiers, where the m-th operational amplifier has a non-inverting input electrically connected to the m-th x-axis sensor, an inverting input electrically connected to the (m+1)-th x-axis sensor, and an output, m=1, 2, 3, . . . , M. The x-axis detector also has M gain amplifiers, the m-th gain amplifier having an input electrically connected to the output of the m-th operational amplifier, and an output, M reference capacitors, the m-th reference capacitor having a first terminal electrically connected to the output of the m-th gain amplifier, and a second terminal electrically connected to ground, and M switches, the m-th switch having a first terminal electrically connected to the output of the m-th gain amplifier, and a second terminal. The x-axis detector further has an analog-to-digital converter (ADC) having an input electrically connected to the second terminal of each of the M switches, and an output, and a subtraction circuit having an input electrically connected to the output of the ADC and an output for outputting touch sensing signals of the (M+1) x-axis sensors.

Furthermore, the touch sensing device includes a y-axis detector comprising N operational amplifiers, the n-th operational amplifier having a non-inverting input electrically connected to the n-th y-axis sensor, an inverting input electrically connected to the (n+1)-th y-axis sensor, and an output, n=1, 2, 3, . . . , N, N gain amplifiers, the n-th gain amplifier having an input electrically connected to the output of the n-th operational amplifier, and an output, N reference capacitors, the n-th reference capacitor having a first terminal electrically connected to the output of the n-th gain amplifier, and a second terminal electrically connected to ground, N switches, the n-th switch having a first terminal electrically connected to the output of the n-th gain amplifier, and a second terminal, an analog-to-digital converter (ADC) having an input electrically connected to the second terminal of each of the N switches, and an output, and a subtraction circuit having an input electrically connected to the output of the ADC and an output for outputting touch sensing signals of the (N+1) y-axis sensors.

In one embodiment, each of the M operational amplifiers and the N operational amplifiers is identical to each other; each of the M gain amplifiers and the N gain amplifiers is identical to each other; each of the M reference capacitors and the N reference capacitors is identical to each other; and each of the M switches and the N switches is identical to each other.

In one embodiment, when the sensor matrix is touched at a junction of the m-th x-axis sensor and the n-th y-axis sensor, a signal is generated responsively and transmitted to both of the inverting input of the (m−1)-th operational amplifier and the non-inverting input of the m-th operational amplifier of the M operational amplifiers, and to both of the inverting input of the (n−1)-th operational amplifier and the non-inverting input of the n-th operational amplifier of the N operational amplifiers, and where the (m−1)-th operational amplifier and the m-th operational amplifier of the M operational amplifiers respectively output a first x-axis signal and a second x-axis signal that is out of phase of the first x-axis signal, and the (n−1)-th operational amplifier and the n-th operational amplifier of the N operational amplifiers respectively output a first y-axis signal and a second y-axis signal that is out of phase of the first y-axis signal, responsive to the generated signal.

In one embodiment, each of the M switches is configured to have an on-state and an off-state such that when the m-th x-axis sensor is touched, the (m−1)-th switch and the m-th switch of the M switches are turned in the on-state, and the other switches of the M switches are turned in the off-state, and where each of the N switches is configured to have an on-state and an off-state such that when the n-th y-axis sensor is touched, the (n−1)-th switch and the n-th switch of the N switches are turned in the on-state, and the other switches of the N switches are turned in the off-state.

In another aspect, the present invention relates to a position detector usable for a touch sensing device. In one embodiment, the position detector includes (P+1) inputs, each input for receiving an input signal associated with a position, P being a positive integer, P operational amplifiers, the j-th operational amplifier having a non-inverting input electrically connected to the j-th input of the (P+1) inputs, an inverting input electrically connected to the (j+1)-th input of the (P+1) inputs, and an output, j=1, 2, 3, ..., P, P gain amplifiers, the j-th gain amplifier having an input electrically connected to the output of the j-th operational amplifier, and an output, P reference capacitors, the j-th reference capacitor having a first terminal electrically connected to the output of the j-th gain amplifier, and a second terminal electrically connected to ground, P switches, the j-th switch having a first terminal electrically connected to the output of the j-th gain amplifier, and a second terminal, an analog-to-digital converter (ADC) having an input electrically connected to the second terminal of each of the P switches, and an output, and a subtraction circuit having an input electrically connected to the output of the ADC and an output for outputting an output signal identified the position.

In one embodiment, each of the P operational amplifiers is identical to each other; each of the P gain amplifiers is identical to each other; each of the P reference capacitors is identical to each other, and each of the P switches is identical to each other.

In one embodiment, when an input signal is input to the j-th input of the (P+1) inputs, it is transmitted to both of the inverting input of the (j−1)-th operational amplifier and the non-inverting input of the j-th operational amplifier of the P operational amplifiers, and the (j−1)-th operational amplifier and the j-th operational amplifier respectively output a first signal and a second signal that is out of phase of the first signal responsive to the input signal.

In one embodiment, each of the P switches is configured to have an on-state and an off-state such that when the signal is input to the j-th input of the (P+1) inputs, the (j−1)-th switch and the j-th switch of the P switches are turned in the on-state, and the other switches of the P switches are turned in the off-state.

In yet another aspect, the present invention relates to a touch sensing device that comprises at least one position detector as disclosed above. The touch sensing device further comprises a sensor matrix comprising a plurality of x-axis sensors spatially arranged in an x-axis direction, and a plurality of y-axis sensors spatially arranged crossing over the plurality of x-axis sensors in a y-axis direction substantially perpendicular to the x-axis direction.

In one embodiment, each of the plurality of x-axis sensors is electrically connected to a corresponding input of the at least one position detector. In another embodiment, each of the plurality of y-axis sensors is electrically connected to a corresponding input of the at least one position detector.

In a further aspect, the present invention relates to a position detector usable for a touch sensing device. In one embodiment, the position detector has (P+1) inputs, each input for receiving an input signal associated with a position, P being a positive integer, and P operational amplifiers, each operational amplifier having a non-inverting input and an inverting input, where the inverting input of the j-th operational amplifier is electrically connected to the non-inverting input of the (j+1)-th operational amplifier, and the non-inverting input and the inverting input of the j-th operational amplifier are electrically connected to the j-th input port and the (j+1)-th input port, respectively, j=1, 2, 3, ..., (P−1).

In one embodiment, when an input signal is input to the j-th input of the (P+1) inputs, it is transmitted to both of the inverting input of the (j−1)-th operational amplifier and the non-inverting input of the j-th operational amplifier of the P operational amplifiers, and the (j−1)-th operational amplifier and the j-th operational amplifier respectively output a first signal and a second signal that is out of phase of the first signal responsive to the input signal.

In one embodiment, each of the P operational amplifiers is identical to each other.

In yet a further aspect, the present invention relates to a touch sensing device comprising at least one position detector disclosed above.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein.

DETAILED DESCRIPTION OF THE INVENTION

Figure 1:
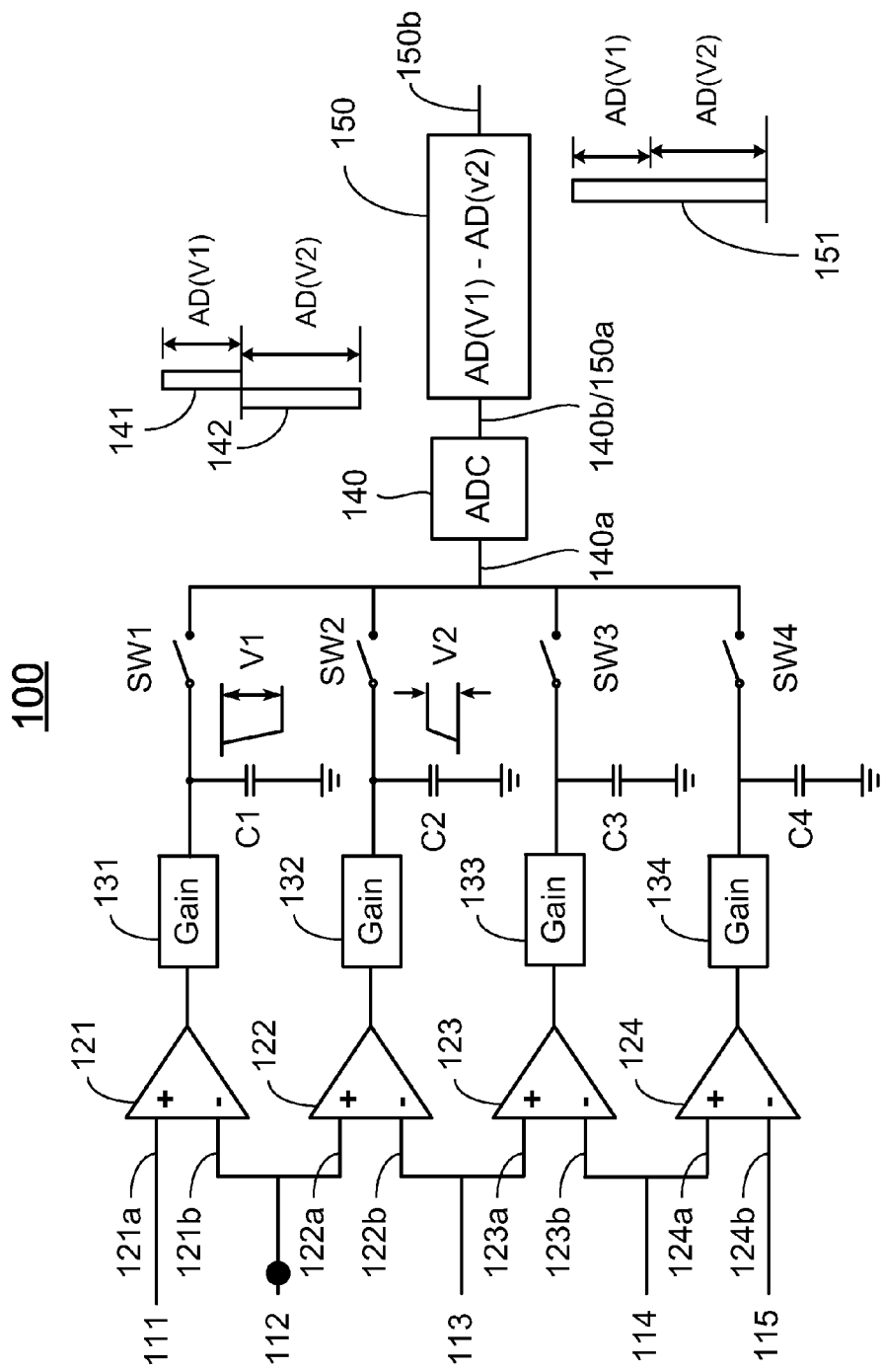
FIG. 1 shows schematically a circuit diagram of a position detector according to one embodiment of the present invention.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. The use of examples anywhere in this specification, including examples of any terms discussed herein, is illustrative only, and in no way limits the scope and meaning of the invention or of any exemplified term. Likewise, the invention is not limited to various embodiments given in this specification.

As used herein, the terms "comprising," "including," "having," "containing," "involving," and the like are to be understood to be open-ended, i.e., to mean including but not limited to.

The description will be made as to the embodiments of the present invention in conjunction with the accompanying drawings of FIGS. 1-3. In accordance with the purposes of this invention, as embodied and broadly described herein, this invention, in one aspect, relates to a position detector and a touch sensing device of using same with SNR enhancement.

Referring now to FIG. 1, a position detector 100 is shown according to one embodiment of the present invention. The position detector 100 includes five input ports, 111-115 and four operational amplifiers 121, 122, 123 and 124. Each input port 111/112/.../115 is adapted for receiving an input signal associated with a position, for example, a touch position in a touch panel.

Each operational amplifier 121/122/123/124 has a non-inverting input and an inverting input. The four operational amplifiers 121, 122, 123 and 124 are differential amplifiers and can be identical to or substantially different from one another. As shown in FIG. 1, the inverting input 121b of the first operational amplifier 121 is electrically connected to the non-inverting input 122a of the second operational amplifier 122; the inverting input 122b of the second operational amplifier 122 is electrically connected to the non-inverting input 123a of the third operational amplifier 123; and the inverting input 123b of the third operational amplifier 123 is electrically connected to the non-inverting input 124a of the fourth operational amplifier 124. Further, the first input port 111 is electrically connected to the non-inverting input 121a of the first operational amplifier 121; the second input port 112 is electrically connected to both the inverting input 121b of the first operational amplifier 121 and the non-inverting input 122a of the second operational amplifier 122; the third input port 113 is electrically connected to both the inverting input 122b of the second operational amplifier 122 and the non-inverting input 123a of the third operational amplifier 123; the fourth input port 114 is electrically connected to both the inverting input 123b of the third operational amplifier 123 and the non-inverting input 124a of the fourth operational amplifier 124; and the fifth input port 115 is electrically connected to the inverting input 124b of the fourth operational amplifier 124.

In operation, when a signal is input to an input port, for example, the second input port 112, the input signal is transmitted to both of the inverting input 121b of the first operational amplifier 121 and the non-inverting input 122a of the second operational amplifier 122. The input signal is then amplified in the first operational amplifier 121 and the second operational amplifier 122, which in turn, output a first amplified signal and a second amplified signal, respectively. For such an arrangement, the second amplified signal is out of phase of the first amplified signal.

Furthermore, the position detector 100 includes four gain amplifiers 131, 132, 133 and 134. Each gain amplifier 131/132/133/134 has an input electrically connected to the output of a corresponding operational amplifier 121/122/123/124 and an output, and is adapted for further amplifying the signal output from the corresponding operational amplifier 121/122/123/124. The four gain amplifiers 131, 132, 133 and 134 can be identical to or substantially different from one another.

Moreover, the position detector 100 also includes four reference capacitors, C1, C2, C3 and C4. Each reference capacitor C1/C2/C3/C4 is electrically connected between the output of a corresponding gain amplifier 131/132/133/134 and ground. The four reference capacitors, C1, C2, C3 and C4 can be identical to or substantially different from one another.

Additionally, the position detector 100 includes four switches, SW1, SW2, SW3 and SW4. Each switch SW1/SW2/SW3/SW4 has a first terminal electrically connected to the output of a corresponding gain amplifier 131/132/133/134, and a second terminal, and has an on-state in which current is allowed to flow from the first terminal to the second terminal of the switch and an off-state in which no current is allowed to flow from the first terminal to the second terminal of the switch. These switches SW1, SW2, SW3 and SW4 are configured such that when a signal is input to an input port, for example, the second input port 112, the first switch SW1 and the second switch SW2 are turned in the on-state, and the other switches (SW3 and SW4) are turned in the off-state.

The position detector 100 also includes an analog-to-digital converter (ADC) 140 and a subtraction circuit 150. The input 140a of the ADC 140 is electrically connected to the second terminal of each switch SW1/SW2/SW3/SW4, and the output 140b of the ADC 140 is electrically connected to the input 150a of the subtraction circuit 150.

When an input signal inputs to an input port, for example, the second input port 112, the input signal is transmitted to both of the inverting input 121b of the first operational amplifier 121 and the non-inverting input 122a of the second operational amplifier 122. The input signal is then amplified in the first operational amplifier 121 and the second operational amplifier 122, which in turn, output a first amplified signal and a second amplified signal that is out of phase of the first amplified signal, respectively. The first amplified signal and the second amplified signal are further amplified by the first gain amplifier 131 and the second amplifier 132, respectively, and then applied to the first reference capacitor C1 and the second capacitor C2, respectively. Accordingly, the first reference capacitor C1 and the second capacitor C2 are charged to have voltage signals V1 and V2, respectively. The voltage signals V1 and V2 are respectively transmitted through the first switch SW1 and the second switch SW2 to the ADC 140, and then respectively converted by the ADC 140 into a first digital signals 141 and second digital signal 142 that is out of phase of the first digital signals 141. The first digital signals 141 has an amplitude of AD(V1) and the second digital signal 142 has an amplitude of AD(V2) are input to the subtraction circuit 150. Accordingly, the subtraction circuit 150 outputs an output signal 151 from the output 150b. The output signal 151 has an amplitude of AD(V1)+AD(V2). Thus, the SNR of detection of an input signal is enhanced substantially according to the present invention.

In the exemplary embodiment, the numbers of the operational amplifiers, the gain amplifiers, the reference capacitors and the switch circuits are four. It should be appreciated by people skilled in the art that other number of the input ports, the operational amplifiers, the gain amplifiers, the reference capacitors and the switch circuits could also be utilized to practice the present invention.

Figure 2:
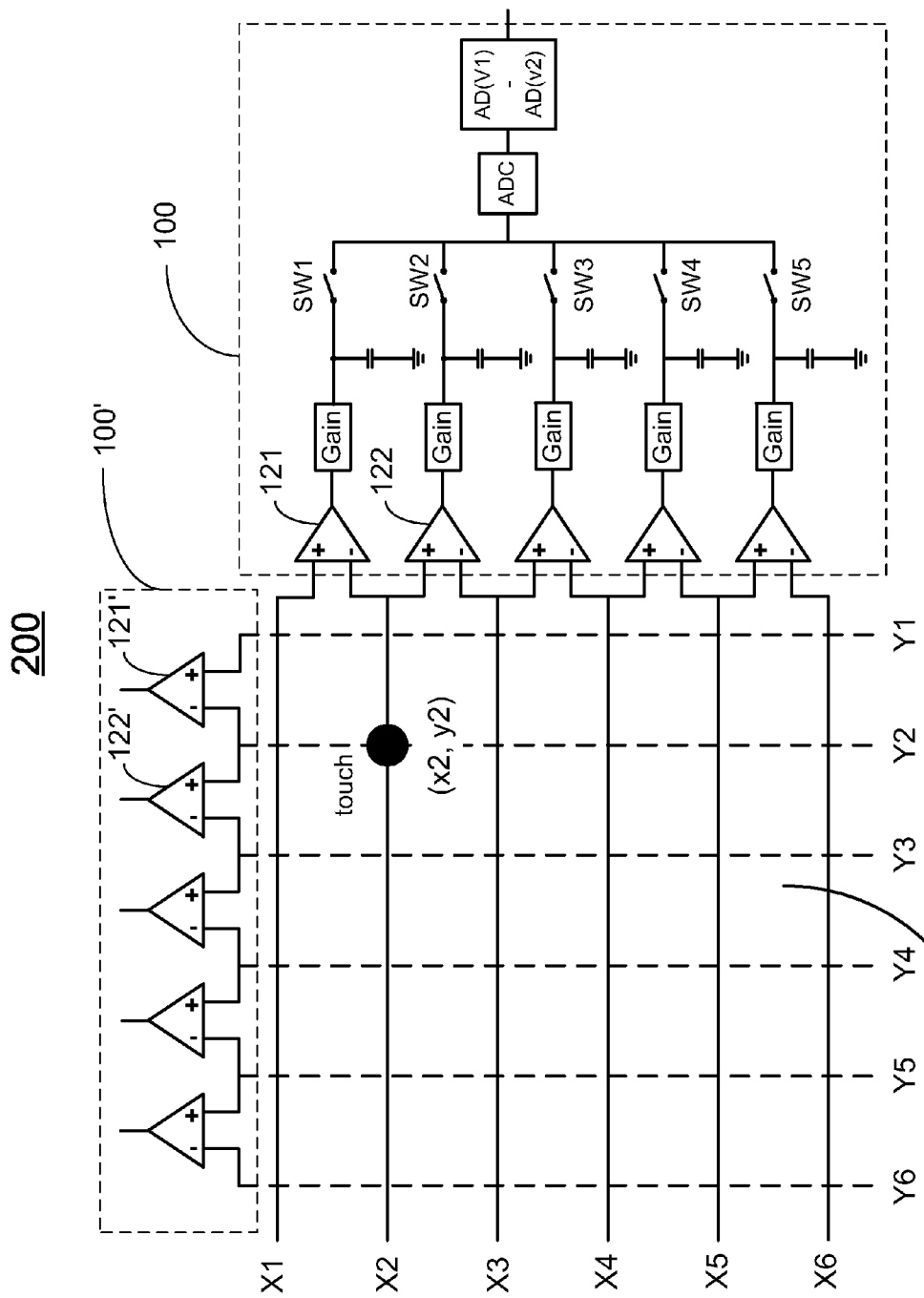
FIG. 2 shows schematically a circuit diagram of a touch sensing device according to one embodiment of the present invention.

FIG. 2 shows a touch sensing (differential input) device 200 that utilizes the position detector 100 shown in FIG. 1 for touch position detection according to one embodiment of the present invention.

The touch sensing device 200 includes a sensor matrix 210 and a first position detector 100 and a second position detector 100'. The sensor matrix 200 comprises (M+1) x-axis sensors (or sensing electrodes), X1, X2, X3, X4, X5 and X6, spatially arranged in an x-axis direction, and (N+1) y-axis sensors (or sensing electrodes), Y1, Y2, Y3, Y4, Y5 and Y6, spatially arranged crossing over the (M+1) x-axis sensors in a y-axis direction substantially perpendicular to the x-axis direction. The x-axis sensors X1, X2, X3, X4, X5 and X6 and the y-axis sensors Y1, Y2, Y3, Y4, Y5 and Y6 are insulated from one another. In the exemplary embodiment, M=5 and N=5. It should be appreciated by people skilled in the art that other number of M and N could also be utilized to practice the present invention.

The first position detector 100 and the second position detector 100' are essentially same, as shown in FIG. 1 and disclosed above.

Figure 4:
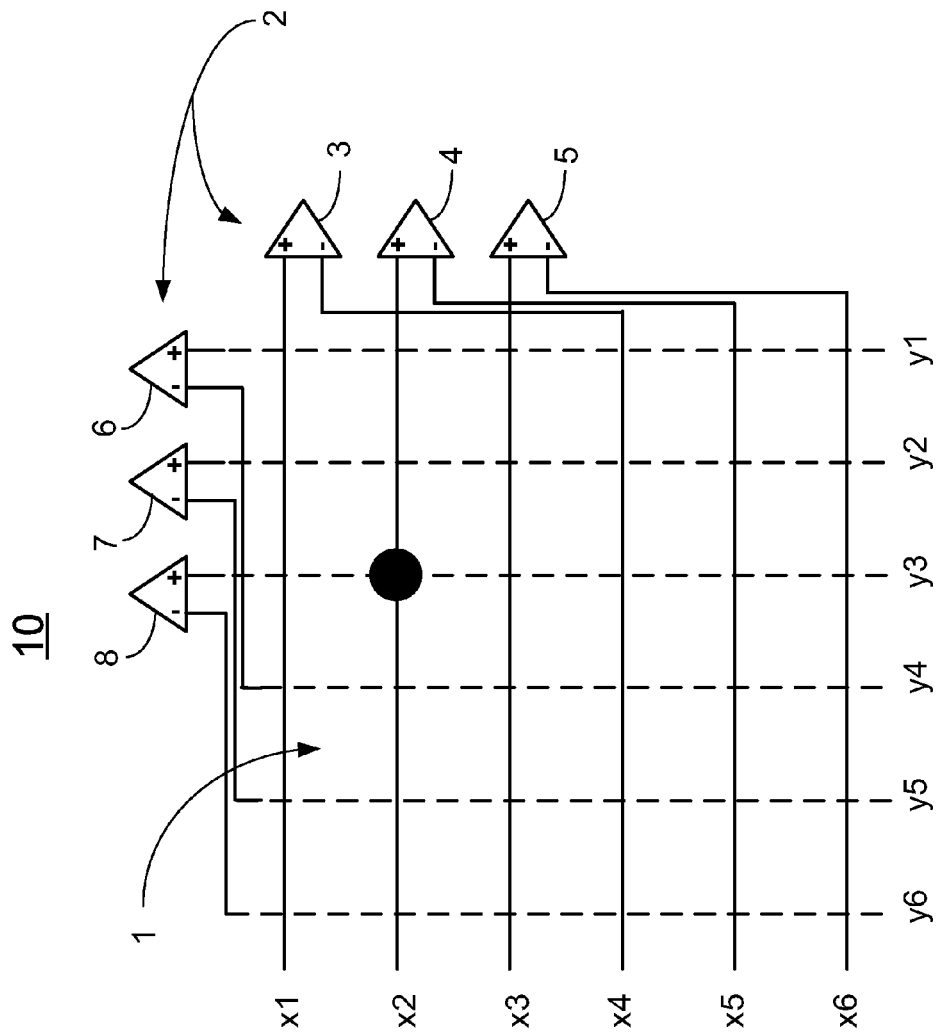
FIG. 4 shows schematically a circuit diagram of a conventional touch sensing device.

When a human finger touches a touch panel having the sensor matrix 210 is touched, for example, at the junction (x2, y2) of the second x-axis sensor X2 and the second y-axis sensor Y2, there are potentials induced between the second x-axis sensor X2 and the finger, and between the second y-axis sensor Y2 and the finger, thereby causing current to pass from the second x-axis sensor X2 and the second y-axis sensor Y2 through the finger to ground. Consequently, potential differences between the first and second x-axis sensors X1 and X2, and between the second and third x-axis sensors X2 and X3 are developed. Also, potential differences between the first and second y-axis sensors Y1 and Y2, and between the second and third y-axis sensors Y2 and Y3 are created. The potential differences between the first and second x-axis sensors X1 and X2, and between the second and third x-axis sensors X2 and X3 are served as a first and second input signals to the first and second operational amplifiers 121 and 122, while the potential differences between the first and second y-axis sensors Y1 and Y2, and between the second and third y-axis sensors Y2 and Y3 are served as a first and second input signals to the first and second operational amplifiers 121' and 122'. In other words, a single touch of the touch panel generates two signals input to the first and second operational amplifiers 121 and 122 for the x-axis detection, and two signals input to the first and second operational amplifiers 121' and 122' for the y-axis detection. These generated signals are amplified by these operational amplifiers 121, 122, 121' and 122', respectively. As described above, the output signal for the x-axis detection has amplitude that is the sum of the amplitudes of the two amplified signals from the first and second operational amplifiers 121 and 122. Similarly, the output signal for the y-axis detection has amplitude that is the sum of the amplitudes of the two amplified signals from the first and second operational amplifiers 121' and 122'. Accordingly, the SNR of signal detection, and thus the sensitivity of the touch sensing device 200, is enhanced substantially. Comparing to the conventional touch sensing device 10 as shown in FIG. 4, among other things, the SNR of signal detection for the invention touch sensing device 200 is twice of that of the conventional touch sensing device 10.

Figure 3:
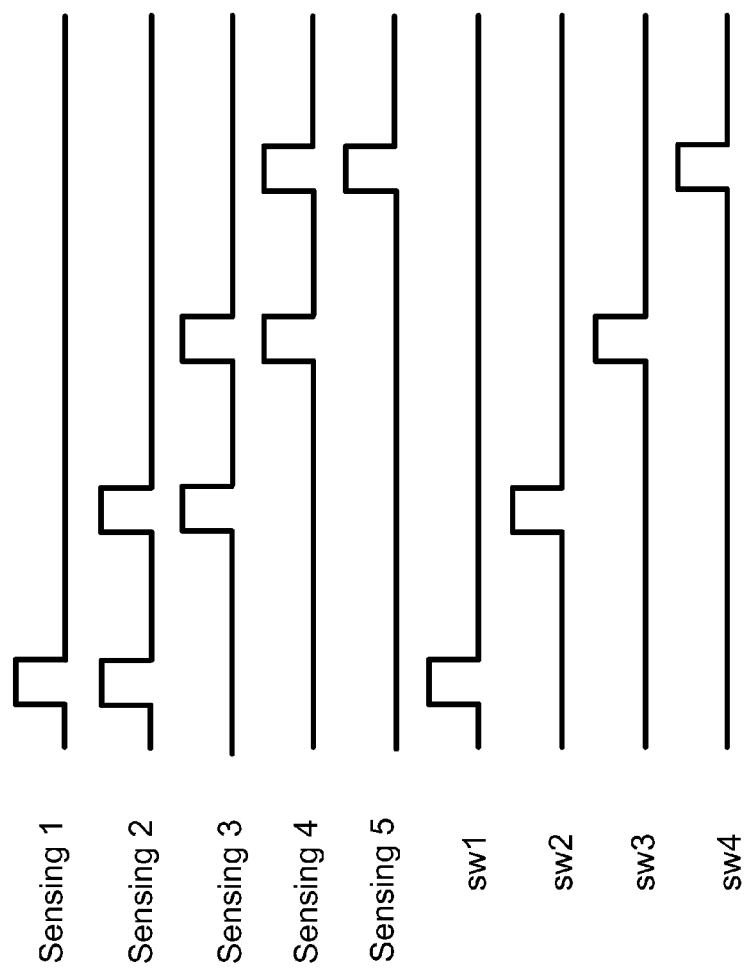
FIG. 3 shows schematically time charts of sensing signals of the touch sensing device shown in FIG. 2.

FIG. 3 shows a flowchart of the sensing signals, Sensing 1, Sensing 2, . . . , Sensing 5, of the sensing electrodes, X1, X2, . . . , X5 (or Y1, Y2, . . . , Y5), and the corresponding signals, sw1, sw2, . . . , sw4, passing through the switches SW1, SW2, . . . , SW4.

In the above exemplary embodiment shown in FIG. 2, the operational amplifiers are arranged such that their non-inverting inputs (+) and inverting inputs (−) are aligned in the order of (+−) (+−) . . . (+−) along both the x-axis and the y-axis directions. It should be appreciated by people skilled in the art that other number of the input ports, other arrangements of the operational amplifiers could also be utilized to practice the present invention. For example, the operational amplifiers can also be arranged such that their non-inverting inputs (+) and inverting inputs (−) are aligned in one of the following orders:

(+−) (+−) . . . (+−) along the x-axis direction, and (−+) (−+) . . . (−+) along the y-axis direction;
(−+) (−+) . . . (−+) along the x-axis direction, and (+−) (+−) . . . (+−) along the y-axis direction; and
(−+) (−+) . . . (−+) along both the x-axis and y-axis directions.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A touch sensing device, comprising:
(a) a sensor matrix comprising (M+1) x-axis sensors spatially arranged in an x-axis direction, and (N+1) y-axis sensors spatially arranged crossing over the (M+1) x-axis sensors in a y-axis direction substantially perpendicular to the x-axis direction, M, N being a positive integer;
(b) an x-axis detector comprising:
(i) M operational amplifiers, the m-th operational amplifier having a non-inverting input electrically connected to the m-th x-axis sensor, an inverting input electrically connected to the (m+1)-th x-axis sensor, and an output, m=1, 2, 3, . . . , M;
(ii) M gain amplifiers, the m-th gain amplifier having an input electrically connected to the output of the m-th operational amplifier, and an output;
(iii) M reference capacitors, the m-th reference capacitor having a first terminal electrically connected to the output of the m-th gain amplifier, and a second terminal electrically connected to ground;
(iv) M switches, the m-th switch having a first terminal electrically connected to the output of the m-th gain amplifier, and a second terminal;
(v) an analog-to-digital converter (ADC) having an input electrically connected to the second terminal of each of the M switches, and an output, and
(vi) a subtraction circuit having an input electrically connected to the output of the ADC and an output for outputting touch sensing signals of the (M+1) x-axis sensors; and
(c) a y-axis detector comprising:
(i) N operational amplifiers, the n-th operational amplifier having a non-inverting input electrically connected to the n-th y-axis sensor, an inverting input electrically connected to the (n+1)-th y-axis sensor, and an output, n=1, 2, 3, . . . , N;
(ii) N gain amplifiers, the n-th gain amplifier having an input electrically connected to the output of the n-th operational amplifier, and an output;
(iii) N reference capacitors, the n-th reference capacitor having a first terminal electrically connected to the output of the n-th gain amplifier, and a second terminal electrically connected to ground;
(iv) N switches, the n-th switch having a first terminal electrically connected to the output of the n-th gain amplifier, and a second terminal;
(v) an analog-to-digital converter (ADC) having an input electrically connected to the second terminal of each of the N switches, and an output, and (vi) a subtraction circuit having an input electrically connected to the output of the ADC and an output for outputting touch sensing signals of the (N+1) y-axis sensors.

2. The touch sensing device of claim 1, wherein when the sensor matrix is touched at a junction of the m-th x-axis sensor and the n-th y-axis sensor, a signal is generated responsively and transmitted to both of the inverting input of the (m−1)-th operational amplifier and the non-inverting input of the m-th operational amplifier of the M operational amplifiers, and to both of the inverting input of the (n−1)-th operational amplifier and the non-inverting input of the n-th operational amplifier of the N operational amplifiers, and wherein the (m−1)-th operational amplifier and the m-th operational amplifier of the M operational amplifiers respectively output a first x-axis signal and a second x-axis signal that is out of phase of the first x-axis signal, and the (n−1)-th operational amplifier and the n-th operational amplifier of the N operational amplifiers respectively output a first y-axis signal and a second y-axis signal that is out of phase of the first y-axis signal, responsive to the generated signal.

3. The touch sensing device of claim 2, wherein each of the M switches is configured to have an on-state and an off-state such that when the m-th x-axis sensor is touched, the (m−1)-th switch and the m-th switch of the M switches are turned in the on-state, and the other switches of the M switches are turned in the off-state, and wherein each of the N switches is configured to have an on-state and an off-state such that when the n-th y-axis sensor is touched, the (n−1)-th switch and the n-th switch of the N switches are turned in the on-state, and the other switches of the N switches are turned in the off-state.

4. The touch sensing device of claim 1, wherein
(a) each of the M operational amplifiers and the N operational amplifiers is identical to each other;
(b) each of the M gain amplifiers and the N gain amplifiers is identical to each other;
(c) each of the M reference capacitors and the N reference capacitors is identical to each other; and
(d) each of the M switches and the N switches is identical to each other.

5. A position detector usable for a touch sensing device, comprising:
(a) (P+1) input ports, each input for receiving an input signal associated with a position, P being a positive integer;
(b) P operational amplifiers, the j-th operational amplifier having a non-inverting input electrically connected to the j-th input port, an inverting input electrically connected to the (j+1)-th input port, and an output, j=1, 2, 3, . . . , P;
(c) P gain amplifiers, the j-th gain amplifier having an input electrically connected to the output of the j-th operational amplifier, and an output;
(d) P reference capacitors, the j-th reference capacitor having a first terminal electrically connected to the output of the j-th gain amplifier, and a second terminal electrically connected to ground;
(e) P switches, the j-th switch having a first terminal electrically connected to the output of the j-th gain amplifier, and a second terminal;
(f) an analog-to-digital converter (ADC) having an input electrically connected to the second terminal of each of the P switches, and an output, and (g) a subtraction circuit having an input electrically connected to the output of the ADC and an output for outputting an output signal identified the position.

6. The position detector of claim 5, wherein when an input signal is input to the j-th input of the (P+1) inputs, it is transmitted to both of the inverting input of the (j−1)-th operational amplifier and the non-inverting input of the j-th operational amplifier of the P operational amplifiers, and the (j−1)-th operational amplifier and the j-th operational amplifier respectively output a first signal and a second signal that is out of phase of the first signal responsive to the input signal.

7. The position detector of claim 6, wherein each of the P switches is configured to have an on-state and an off-state such that when the input signal is input to the j-th input of the (P+1) inputs, the (j−1)-th switch and the j-th switch of the P switches are turned in the on-state, and the other switches of the P switches are turned in the off-state.

8. The position detector of claim 5, wherein
(a) each of the P operational amplifiers is identical to each other;
(b) each of the P gain amplifiers is identical to each other;
(c) each of the P reference capacitors is identical to each other; and
(d) each of the P switches is identical to each other.

9. A touch sensing device, comprising at least one position detector of claim 5.

10. The touch sensing device of claim 9, further comprising a sensor matrix comprising a plurality of x-axis sensors spatially arranged in an x-axis direction, and a plurality of y-axis sensors spatially arranged crossing over the plurality of x-axis sensors in a y-axis direction substantially perpendicular to the x-axis direction.

11. The touch sensing device of claim 10, wherein each of the plurality of x-axis sensors is electrically connected to a corresponding input of the at least one position detector.

12. The touch sensing device of claim 10, wherein each of the plurality of y-axis sensors is electrically connected to a corresponding input of the at least one position detector.

13. A position detector usable for a touch sensing device, comprising: (a) (P+1) inputs, each input for receiving an input signal associated with a position, P being a positive integer; and (b) P operational amplifiers, each operational amplifier having a non-inverting input and an inverting input, wherein the inverting input of the j-th operational amplifier is electrically connected to the non-inverting input of the (j+1)-th operational amplifier, and wherein the non-inverting input and the inverting input of the j-th operational amplifier are electrically connected to the j-th input port and the (j+1)-th input port, respectively, j=1, 2, 3, . . . , (P−1); wherein when an input signal is input to the j-th input of the (P+1) inputs, it is transmitted to both of the inverting input of the (j−1)-th operational amplifier and the non-inverting input of the j-th operational amplifier of the P operational amplifiers, and the (j−1)-th operational amplifier and the j-th operational amplifier respectively output a first signal and a second signal that is out of phase of the first signal responsive to the input signal.

14. The position detector of claim 13, wherein each of the P operational amplifiers is identical to each other.

15. A touch sensing device, comprising at least one position detector of claim 13.

* * * * *